United States Patent [19]

Williams et al.

[11] Patent Number: 5,032,058

[45] Date of Patent: Jul. 16, 1991

[54] CALIBRATED FLUID INJECTION SYSTEM

[75] Inventors: James F. Williams, Newhall; Wilfred D. Pascual, Rowland Heights, both of Calif.

[73] Assignee: Williams Instrument Company, Inc., Valencia, Calif.

[21] Appl. No.: 424,808

[22] Filed: Oct. 20, 1989

[51] Int. Cl.⁵ .................... F04B 21/00; F01B 31/14
[52] U.S. Cl. ................................ 417/63; 92/13.6; 417/407; 33/DIG. 15
[58] Field of Search ............. 417/63, 401; 92/13.6; 33/813, 654, 607, DIG. 15

[56] References Cited

U.S. PATENT DOCUMENTS

| | | | |
|---|---|---|---|
| 2,576,747 | 11/1951 | Bryant | 92/13.6 |
| 3,492,946 | 2/1970 | Martin | 417/401 |
| 4,309,156 | 1/1982 | Gonner et al. | 92/13.6 |
| 4,370,997 | 2/1983 | Williams | 137/99 |
| 4,422,830 | 12/1983 | Perkins | 417/54 |

Primary Examiner—Leonard E. Smith
Assistant Examiner—John A. Savio, III
Attorney, Agent, or Firm—Lyon & Lyon

[57] ABSTRACT

A fluid injection system is disclosed. The fluid injection system incorporates an injection pump comprising an adjustable restriction device that is used to control the extent of the movement of the pumping mechanism in the injection pump. An adjustable gauge and an adjustable marker are used to accurately calibrate and accurately position the adjustable restriction device. When the adjustable restriction device is accurately calibrated and correctly positioned, a precise amount of additive is injected into the pipeline.

9 Claims, 1 Drawing Sheet

5,032,058

CALIBRATED FLUID INJECTION SYSTEM

BACKGROUND OF THE INVENTION

This invention relates to a fluid injection system for injecting additives into a fluid flowing through a pipeline. In particular, this invention relates to an apparatus for accurately calibrating the injection pump used in the fluid injection system.

Injection pumps are used in a variety of applications for injecting additives into pipelines. One industry that extensively uses injection pumps is the gas transmission industry. Transporting pure natural gas is extremely dangerous because the gas is invisible and odorless. Thus, gas leaks are not readily detected by humans. To provide for prompt and effective gas leak detection, odorants are injected into the gas pipelines. Some additional uses for injection pumps include, injecting chlorine into water lines; injecting corrosion and scale inhibitors into petrochemical lines; and injecting coloring agents into food processing lines.

One type of injection pump used for these and other applications is made by Williams Instrument Company, Inc. of Valencia, Calif. 91355. This pump is commonly known by its registered trade name, OSCILLAMATIC. Injection pumps, like the Williams Instrument OSCILLAMATIC pump, generally incorporate a means for regulating the amount of additive injected into the pipeline. The regulation means might comprise an adjustable restriction device that limits the movement of the pumping mechanism. In the case of the Williams Instrument OSCILLAMATIC pump, the pumping mechanism is a plunger connected to a piston. By adjustably restricting the movement of the piston, the stroke length of the plunger is controlled. Adjusting the stroke length of the plunger causes the injection of more or less additive, as desired, into the pipeline. In the Williams Instrument OSCILLAMATIC pump, the adjustable restriction device is a threaded stud screwed into the top of the pump that contacts the top of the piston. By screwing the stud in, the movement of the piston is additionally restricted reducing the stroke length of the pumping plunger, thereby decreasing the amount of fluid injected into the pipeline for each stroke of the pumping plunger. Similarly, screwing the stud out results in an increased plunger stroke length and the injection of more fluid into the pipeline for each stroke of the pumping plunger.

However, heretofore, there was no simple device for accurately calibrating the regulation means to control the precise amount of additive injected into the pipeline. Yet, precision in controlling the amount of additive injected into the pipeline is generally desireable and frequently necessary.

SUMMARY OF THE INVENTION

The present invention discloses a means for precisely regulating the amount of an additive injected into a pipeline by a fluid injection system. The means disclosed is simple but ingenious.

Briefly, the fluid injection system involves the use of an injection pump having an adjustable restriction device that incorporates a moveable and thus adjustable gauge placed over a movable and thus adjustable marker. The gauge and marker are placed over a moveable stroke adjuster and provide for accurate calibration and correct positioning of the stroke adjuster. The stroke adjuster is positioned to limit the movement of the pumping mechanism of the injection pump and thereby controlling the stroke length of the pumping plunger. When the stroke adjuster is accurately calibrated and correctly positioned, the desired amount of an additive is injected into the pipeline.

DESCRIPTION OF THE DRAWINGS

These and other features, aspects and advantages of the present invention will become better understood with reference to the following description, appended claims, and accompanying drawings where:

DESCRIPTION OF THE PREFERRED EMBODIMENT

Figure 1:
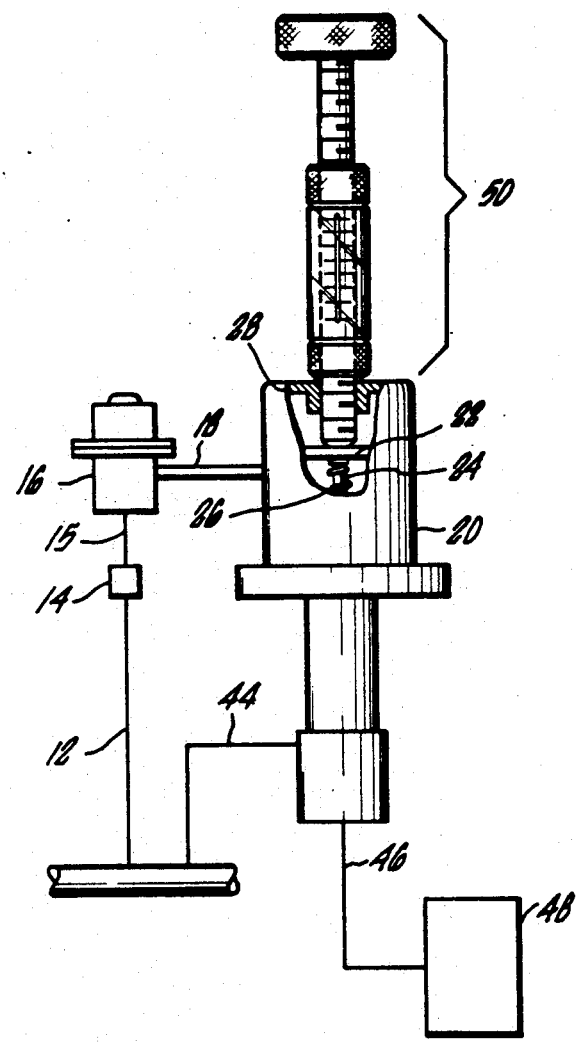
FIG. 1 is a schematic view of the fluid injection system with a partial cross-sectional view of the injection pump.

Referring now in detail to the drawings, the elements of the fluid injection system are shown in FIG. 1. Main process flow line 10 has a gas or other flowable medium flowing inside. In the preferred embodiment the source of pressure used to activate the injection pump 20 is the fluid pressure in the flow line. Alternatively, an independent source of fluid can be used to actuate the pump. If the flow line fluid pressure is used, the flow line can be connected by means of a conduit 12 to a pressure regulator 14. The pressure regulator is connected by means of a conduit 15 to a valve 16. The valve and the injection pump are connected by means of a conduit 18.

In the preferred embodiment the injection pump has a pumping mechanism that comprises a piston 22 and an injection or pumping plunger 24. The power or downward stroke of the pumping mechanism results from intermittent application of a fluid pressure from the valve 16 into a piston chamber 28. The return or upward stroke of the pumping mechanism is caused by spring 26 when the pressure in the piston chamber is vented. The cycling of the pumping mechanism draws additive fluid into the injection pump through conduit 46 from supply reservoir 48 and forces it out of the injection pump through conduit 44 into main process flow line 10.

Figure 2:
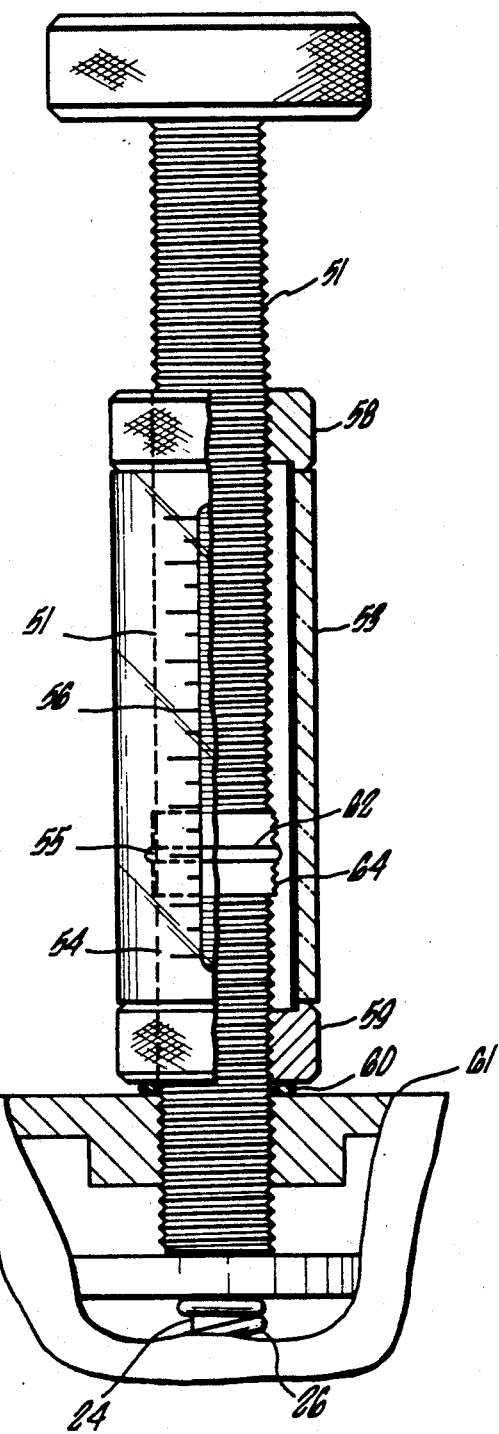
FIG. 2 is an enlargement of the adjustable restriction device depicted in FIG. 1 with the gauge partially cut away.

The upward movement of the pumping mechanism is limited by an adjustable restriction device 50. Referring to FIG. 2, the adjustable restriction device comprises a stroke adjuster 51, in the preferred embodiment a threaded stud, screwed into the piston chamber 28. The movement of the pumping mechanism can be further restricted, in addition to that depicted, by screwing the stroke adjuster further into the piston chamber. The movement of the pumping mechanism can be less restricted by screwing the stroke adjuster further out of the piston chamber. The positioning of the stroke adjuster thus limits the stroke length of the pumping plunger.

The amount of additive injected into the flow line is directly proportional to the stroke length of the pumping plunger 24. Thus, if screwing the stroke adjuster 0.10 inches further into the piston chamber decreases the amount of additive injected into the flow line by 0.20 gallons each hour; then screwing the stroke adjuster 0.10 inches further out of the piston chamber decreases the amount of additive injected into the flow line by 0.20 gallons each hour.

In the preferred embodiment, the stroke adjuster can be screwed into or out of the piston chamber only if it affects the movement of the pumping plunger. In other words, once the movement of the pumping plunger is entirely restricted, then the stroke adjuster can be screwed no further into the piston chamber. And, once the movement of the pumping plunger is entirely unrestricted, within the limitations of the injection pump, then the stroke adjuster can be screwed no further out of the piston chamber. The inward and outward movement of the stroke adjuster can be limited by a variety of means readily determinable by one skilled in the art.

Placed over the stud is a gauge 53. The gauge incorporates various indicators including those marked 54, 55, 56 and 57. In the preferred embodiment, the first indicator 54 states 0.0 gallons each hour. All other indicators state a particular fluid volume. The indicators are spaced on the gauge a distance equal to the distance the stroke adjuster must travel to increase or decrease the amount of additive injected into the flow line consistent with the change in volumes stated on adjacent indicators. In other words, if indicator 56 states 1.0 gallons each hour and indicator 58 states 1.2 gallons each hour, then the distance between indicator 56 and 58 is equal to the distance that the stroke adjuster must travel into or out of the piston chamber to change the amount of additive injected into the flow line by 0.20 gallons each hour.

The gauge can be slid up and down the length of the stud, but is generally fastened in one position by use of locking nut 58 and locking nut 59. The gauge is used in conjunction with a marker 62 that is placed between the gauge and the stud. In the preferred embodiment, the gauge and marker are slightly separated to avoid displacement of the marker when the gauge is moved. Additionally, in the preferred embodiment, a cover 64 is placed between the marker and the stud. The cover can serve a variety of purposes depending on the type of marker used. For example, the cover can increase the visibility of the marker, facilitate movement of the marker and decrease the likelihood that the marker is damaged when moved. Appropriate positioning of the cover can be achieved by using a heat shrinkable material. Visibility is increased using a white colored cover.

The gauge and the marker are used as follows. In the preferred embodiment, the stud is screwed fully into the piston chamber. Locking nut 59 is moved into a position immediately adjacent to pump 20 or, alternatively, immediately adjacent to an optional seal 60 that is securely positioned around the stroke adjuster at the location where the stroke adjuster first threads into housing 61. The gauge is then moved into a position immediately adjacent to locking nut 59. The marker 62 is thereafter adjusted to a position that corresponds to the zero indicator 54.

In use, the operator screws the stroke adjuster partially or totally out of the piston chamber. Then, the operator locates the gauge so that the marker corresponds with the indicator that states the desired amount of additive that is sought to be injected into the flow line. Both locking nuts are tightened into position to maintain correspondence between the gauge and the marker. Then, the stroke adjuster is screwed into the piston chamber until locking nut 59 is immediately adjacent to housing 61 or seal 60. When actuated, the pump will inject the desired amount of additive into the flow line.

For example, as shown in FIG. 2, the marker corresponds with indicator 55. The gauge has already been secured in position by locking nuts 58 and 59. Additionally, locking nut 59 has been moved immediately adjacent to seal 60. Thus, and assuming proper injection pump construction as described herein and accurate calibration of the stroke adjuster as explained herein, if indicator 55 states 0.4 gallons each hour, when the pump 20 is actuated, precisely 0.4 gallons of additive will be injected into the flow line.

Various changes and modifications may be made in carrying out the instant invention without departing from the spirit and scope thereof. Insofar as these or other changes and modifications are within the purview of the appended claims, they are to be considered as part of the invention.

I claim:

1. An injection pump comprising:
   a) a pumping mechanism wherein the movement of the pumping mechanism injects an additive into a pipeline;
   b) a stroke adjuster proximate to the pumping mechanism for regulating the stroke length of the pumping mechanism;
   c) an adjustable marker adjacent to the stroke adjuster;
   d) an adjustable gauge adjacent to the adjustable marker and used in conjunction with the adjustable marker for calibrating the injection rate of the injection pump; and
   e) a means for fixedly locating the adjustable gauge to the stroke adjuster wherein when the adjustable gauge is fixedly located the stroke adjuster can be positioned correctly by using the adjustable gauge to limit the stroke length of the pumping mechanism whereby the rate the additive is injected into the pipeline is established at substantially one amount.

2. The injection pump of claim 1 wherein the adjustable marker is located between the stroke adjuster and the adjustable gauge.

3. The injection pump of claim 2 wherein a cover is located between the adjustable marker and the stroke adjuster.

4. The injection pump of claim 3 wherein the cover is constructed of a shrinkable material.

5. The injection pump of claim 3 wherein the cover is constructed of a white material.

6. The injection pump of claim 2 wherein the adjustable marker and the adjustable gauge are spaced slightly apart.

7. The injection pump of claim 1 wherein the means for fixedly locating the adjustable gauge comprises two locking nuts.

8. The injection pump of claim 1 wherein the adjustable marker is an O-ring.

9. An injection pump comprising:
   a) an adjustable restriction device that is calibrated such that a substantially accurate amount of an additive is injected into a pipeline by the injection pump when the adjustable restriction device is positioned correctly;
   b) a pumping mechanism proximate to the adjustable restriction device, comprising a piston and a pumping plunger, wherein the movement of the pumping mechanism is limited by the positioning of the adjustable restriction device;

c) a marker placed over the adjustable restriction device;

d) a gauge proximate to the marker that is adjustable and securable to the adjustable restriction device and is used in combination with the marker to calibrate the adjustable restriction device and to correctly position the adjustable restriction device relative to the pumping mechanism when the gauge is secured.

* * * * *